United States Patent [19]

Miyaoka et al.

[11] Patent Number: 4,562,552
[45] Date of Patent: Dec. 31, 1985

[54] METHOD AND APPARATUS FOR CONTROLLING PRESSURE AND FLOW IN WATER DISTRIBUTION NETWORKS

[75] Inventors: Shinichiro Miyaoka, Kawasaki; Teruji Sekozawa, Machida; Motohisa Funabashi, Sagamihara; Shinobu Hayashi, Hitachi, all of Japan

[73] Assignees: Hitachi, Ltd.; Hitachi Control Systems Inc., both of Tokyo, Japan

[21] Appl. No.: 462,766

[22] Filed: Feb. 1, 1983

[30] Foreign Application Priority Data

Feb. 24, 1982 [JP] Japan ................................. 57-27431

[51] Int. Cl.$^4$ ..................... G05D 7/00; G05B 13/02
[52] U.S. Cl. .................................... 364/510; 364/148; 137/624.11; 137/561 R; 137/255
[58] Field of Search ............... 364/509, 510, 148, 138; 137/561, 624.11, 571, 99, 255, 486

[56] References Cited

U.S. PATENT DOCUMENTS

| | | | |
|---|---|---|---|
| 3,608,572 | 9/1971 | Hass | 364/510 |
| 3,949,207 | 4/1976 | Savary et al. | 364/510 |
| 4,119,391 | 10/1978 | Rutshtein | 137/99 |
| 4,134,423 | 1/1979 | Mayer | 364/510 |
| 4,180,083 | 12/1979 | Miyaoka et al. | 137/571 |
| 4,200,911 | 4/1980 | Matsumoto | 364/510 |
| 4,217,647 | 8/1980 | Sjöholm et al. | 364/510 |
| 4,417,312 | 11/1983 | Cronin et al. | 364/510 |

Primary Examiner—Errol A. Krass
Assistant Examiner—Thomas G. Black
Attorney, Agent, or Firm—Antonelli, Terry & Wands

[57] ABSTRACT

A control method and apparatus incorporate a network model simulating hydraulic phenomena within a water distribution network whereby the pressures and flow rates within the water distribution network are controlled by an optimizing unit for inputting the current total demand as a model input and computing manipulated variables or control amounts for optimizing the pressures and flow rates in accordance with a network algorithm and a correction computing unit for computing the necessary control amount correction values for correcting the deviations from the estimated pressures and flow rates in accordance with a sensitivity matrix indicating the effects of variations in the control amounts on the pressures and flow rates.

3 Claims, 3 Drawing Figures

METHOD AND APPARATUS FOR CONTROLLING PRESSURE AND FLOW IN WATER DISTRIBUTION NETWORKS

BACKGROUND OF THE INVENTION

The present invention relates to method and apparatus for controlling water distribution networks of waterworks to the like and, more particularly, to a method and apparatus for controlling the pressure and flow in water distribution networks.

The water distribution systems of waterworks include the complex distribution networks extended over a wide area. The present invention is intended to remotely operate the pumps and valves arranged on the distribution networks and thereby properly control the pressure and flow distribution in the distribution networks so as to ensure the service pressure for consumers and for preventing a high pressure which causes the leakage of water.

A number of methods have been proposed for controlling the distribution of water in waterworks. More particularly, in, for example, "Uniform Pressure Control in Water Distribution Networks", Sato, Journal of Japan Water Association, November, 1971, and "Program for Maintaining the Required Head at the Extremities of a Water Distribution Network", Ozawa, Mitsubishi Denki GiHo, September, 1980, systems are proposed respectively employing Newton's method and quadractic programming for obtaining the desired manipulated variables for controlling the pressure at the proper value.

Disadvantages of these proposed systems resides in the fact that the systems are incapable of correcting a difference between the estimation and actual measurement relating to the pressure and flow which might be caused if the control is effected by means of calculated manipulated variables. Moreover, a computation of the manipulated variables requires an excessive time and the systems cannot be used on an on-line basis.

The aim underlying the present invention essentially resides in over-coming the above-noted disadvantages of the prior art by providng a control method and apparatus whereby manipulated variables or control amounts for properly controlling the pressures and flows are computed in such a short time so as to allow the system to be used on the on-line basis (less than five minutes) so that if, after the actual operation, the actual measured pressures and flows are still insufficient, the desired corrections for the control amounts are computed rapidly and the corrections are actually effected thereby always maintaining the proper pressures and flows.

In accordance with the present invention a method and apparatus is provided featuring a pressure/flow controller including a unit for computing optimum manipulated variables or a control amount optimum computing unit and a unit for correcting the control amounts in accordance with the actual measured values or a correction computing unit, with the optimum computing unit incorporating a network model simulating hydraulic phenomena within a distribution network so as to input the current total demand (the sum of the reservoir outlet flow rates) and thereby compute the optimum control amounts in a short time by high speed computation according to a network algorithm (see R. G. Busacher, T. L. Saaty: Finite Graph and Networks, McGraw-Hill, 1965), and with the correction computing unit utilizing a sensitivity matrix which indicates the effects of variations in the control amounts on the pressures and flows so as to compute control amount corrections and thereby correct the deviations from the estimated pressure and flow rate values.

DETAILED DESCRIPTION

Figure 1:
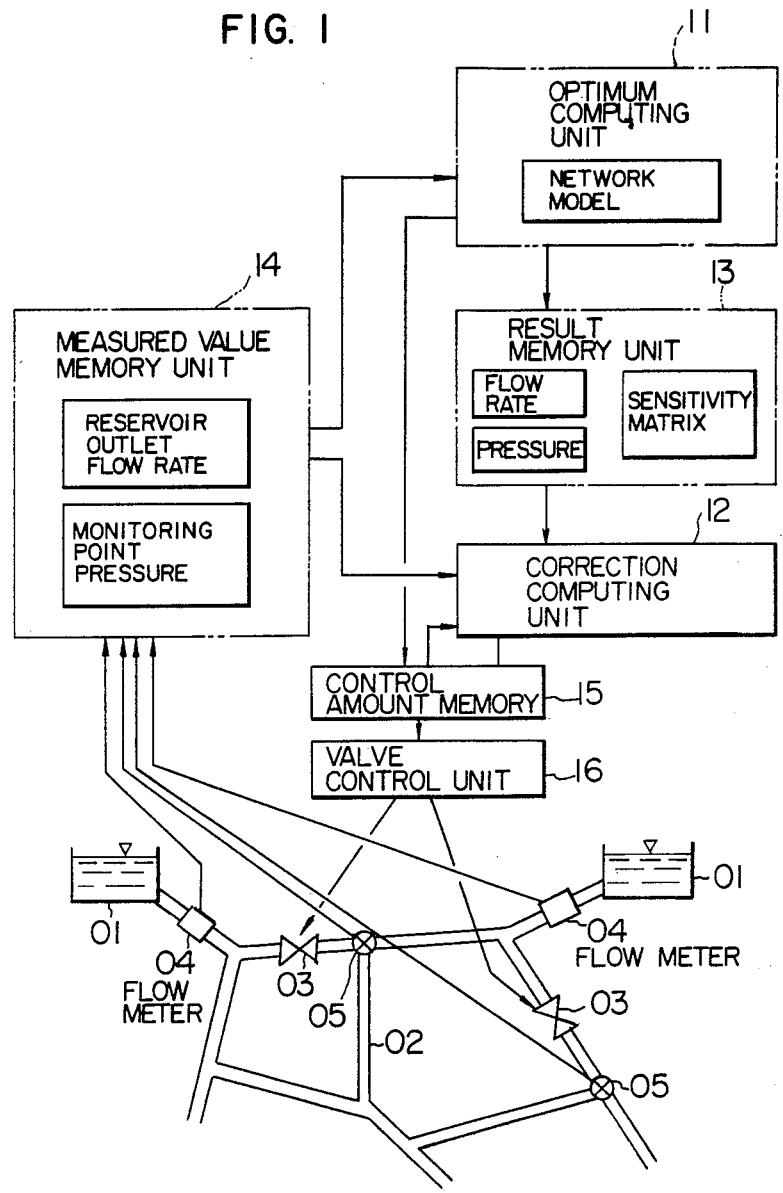
FIG. 1 is a diagram showing the overall construction of a water distribution control system employing a method according to the invention.

The principles of computational processing of an optimum computing unit and a correction computing unit according to the invention will be described first.

The flow of water in a water distribution network can be expressed in accordance with a known flow continuity equation which holds for each node and a known pressure balance equation which holds between the nodes. The network model incorporated in an optimum computing unit 11 is a system of nonlinear algebraic equations obtained by using the above-mentioned conditional expressions and it can be completely prescribed by giving the connecting structure, pipe diameter, pipe length, etc., of the pipe lines. The model input data include the demands at the respective nodes and the control amounts for the pumps and valves and these data are used for computation of the corresponding pressures and flows by the model simulation (an equation solution).

The optimum computing unit 11 utilizes the distribution network model freely and obtains the optimum control amounts. Particularly, provisions are made so as to speed up the model simulation and thereby effect the necessary computations under the on-line conditions. Firstly, the object function required for providing a basis for optimization is established in accordance with the following relationship:

$$\tau = \sum_i \alpha_i (P_i - P_i^*)^2 + \sum_j \beta_j (x_j - x_j^*)^2 \quad (1)$$

where, $P_i$ and $P_i^*$ are respectively the pressure of a node i and its desired value, $x_j$ and $x_j^*$ are respectively the flow of a pipe line j and its desired value and $\alpha_i$ and $\beta_j$ are weighting factors. The procedure of the optimizing computation is as follows:

(i) The demands at the respective nodes are estimated from the reservoir outlet flow rates (the actual measured values) and inputted to the distribution network model.

(ii) Suitable initial control amounts are determined and inputted to the model.

(iii) The distribution network model simulation is effected to compute the pressures and flow rates.

(iv) The pressures and flow rates are applied to the equation (1) to compute an object function value.

(v) The termination condition is checked in accordance with the object function values so that, if the termination condition is satisfied, the computation is completed (or after the completion, a sensitivity matrix may be obtained), and if the condition is not satisfied, the processing proceeds to (vi).

(vi) The control amounts are modified and the processing proceeds to (iii).

The repeated computation of (iii) to (vi) generally takes place several tens to several hundreds of times. Of these operations, the model simulation of (iii) requires the longest computing time and therefore the network flow algorithm is utilized to speed up the model simulation. The basic concept of this procedure is as follows: The flow of water within the distribution network is naturally determined to minimize the energy loss within the network. By utilizing this nature, it is possible to perform the model simulation according to a calculating method for obtaining the minimum cost flow of the network (here the energy is regarded as the cost). Since this method is not only performed at a high speed but also capable of obtaining the pressures and flows corresponding to variations in the control amounts only by slightly correcting the preceding values, it is possible to speed up the computation.

A matrix of elements relating to the effects of small changes in the control amounts on the measured quantities is called as a sensitivity matrix (e.g., m×r matrix where r is the number of control points and m is the number of measuring points). This sensitivity matrix can be obtained incidentally in the 11 optimum computing unit. Gains are computed from the sensitivity matrix and the corrections for the control amounts are computed by multiplying the deviations of the measured values from the estimated values resulted from the optimum computation by the gains.

As shown most clearly in FIG. 1, a controlled system or a water distribution network includes reservoirs 01, pipe lines 2, valves 03, flow meters 04 and pressure gauges 05. On the other hand, a control system includes the optimum computing unit 11 for computing the optimum valve control amounts, a correction computing unit 12 for making small corrections to the control amounts, a measured value memory unit 14 for storing reservoir outlet flow rates and monitoring point pressures, a result memory unit 13 for storing the flow rates, pressures and sensitivity matrix resulting from an optimum computation, a control amount memory unit 15 for storing the control amounts resulting from an optimum computation or correction computation, and a valve control unit 16.

The optimum computing unit 11 is first actuated so that the current reservoir outlet flow rates are inputted and an optimum control amount and the corresponding flow rate (in each pipe line), pressure (at each node) and sensitivity matrix are computed and stored in the memory units 15, 13, respectively. The valve control unit 16 actually operates the valves 03 in accordance with the control amounts. The data in the measured value memory unit 14 are updated at intervals of a predetermined time and the new flow rates and pressures after each valve operation are written into the memory unit 14. The correction computing unit 12 reads from the memory units 13, 14, respectively, the estimated values and measured values of the reservoir outlet flow rates and the monitoring point pressures, respectively, and it also reads the current control amounts from the memory unit 15 thereby computing control amount corrections and then writing new control amounts into the memory unit 15. The valve control unit 16 controls the valves 03 in accordance with the new control amounts read from the memory unit 15.

Figure 2:
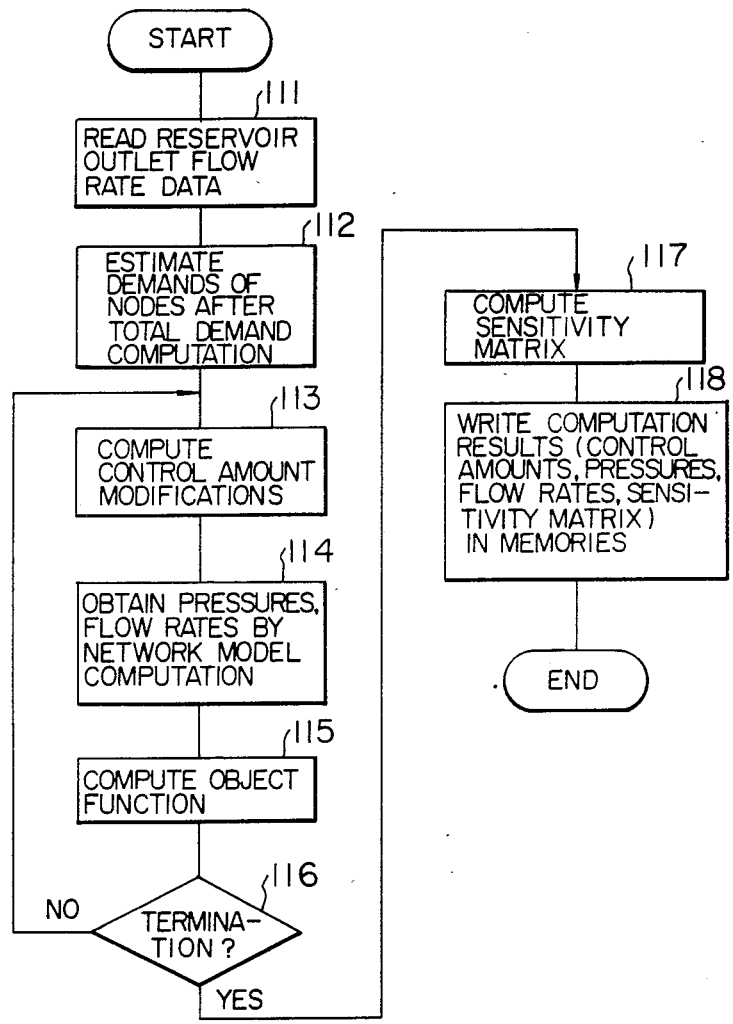
FIG. 2 is a flow chart for operating the optimum computing unit of FIG. 1 in accordance with a computer program.

FIG. 2 shows a flow chart for operating the optimum computing unit 11 in accordance with a computer program to perform the computation of the above (i) to (vi). A step 111 reads the reservoir outlet flow rate $w_i$ ($i = 1, \ldots, r$) to the demand ends from the ith reservoir of r reservoirs. A step 112 computes a total demand $$\sum_{i=1}^{r} w_i$$

and then estimates the demand $y_j$ at each node from the following relationship;

$$y_j = \sum_{i=1}^{r} w_i \times r_j \qquad (2)$$

where, $r_j$ is the estimated value of a proportion of the demand at a jth node to the total demand and it can be obtained from the population data, meter inspection data or the like. A step 113 computes modified values of the control amounts by using the simplex method (see L. C. W. Dickson: "Nonlinear Optimization Methods" (Baifu Kan)) which is a kind of the down-hill method. A step 114 performs a network model simulation in accordance with the modified control amounts so as to obtain the pressures at all the nodes and the flow rates of all the pipe lines. The model simulation is accomplished in accordance with the concept stated above and the known primal-dual method or primal method, which is one of the network computation methods, is used as a computation method of the type which minimizes the cost (see R. G. Busacher, T. L. Saaty: Finite Graph and Networks: McGraw-Hill, 1965). In particular, since no feasible flows (the flow rates and pressures which satisfy the flow continuity equation and the pressure balance equation) may be given at the first stage, the primal-dual method which can start computation with no feasible flows is used for finding feasible flows for the given initial control amounts. For the second and following computations, however, the feasible flows are already obtained from the computation at the previous stage and therefore the primal method is used which is capable of correcting the existing feasible flows to obtain new flows. In a step 115, the obtained pressures and flow rates are applied to equation (1) to compute the object function. A step 116 performs the determination of a termination in accordance with the algorithm of the simplex method and the process proceeds to a step 117 if the termination is determined and returns to the step 113 if the termination is not determined. In the step 117, each of the control amounts is slightly varied around the optimum value and the model simulation is performed on each of them for computing the rate of change of the pressure and flow rate. Thus, a sensitivity matrix is obtained. A step 118 writes the computation results including the manipulated variables, pressures, flow rates and sensitivity matrix in the memory unit 13. The above-described computing method speeds up the model simulation carried out with every modification of manipulated variables or control variables and the computation time on the whole is reduced considerably as compared with the similar conventional methods. For instance, the computing time is less than one tenth of that obtained by using the Newton's method.

Where the Hitachi control computer HIDIC-80E is used, for example, the computing time of about five minutes is sufficient.

Figure 3:
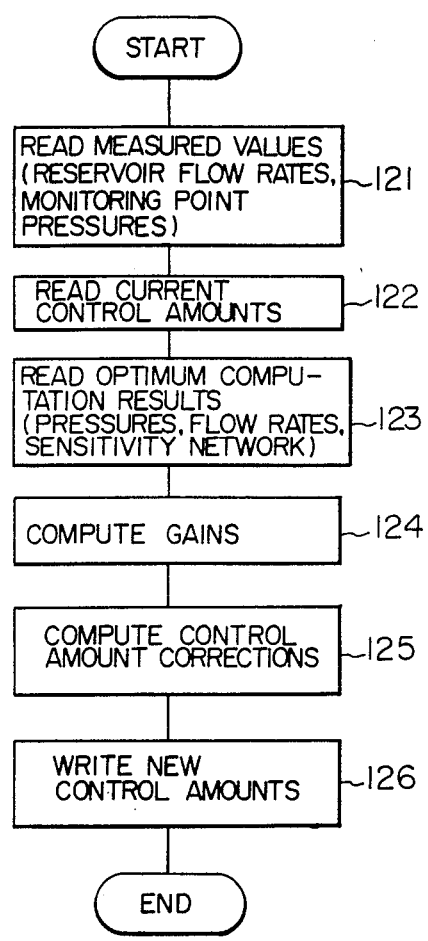
FIG. 3 is a flow chart for operating the correction computing unit of FIG. 1 in accordance with the computer program.

FIG. 3 shows a flow chart of operation of the correction computing unit 12 when effected by a computer program. A step 121 reads in the measured values and a step 122 reads in the current control amounts. A step 123 reads in the optimum computation results, and a step 124 computes a gain from the following relationship:

$$G = -(Y^T P Y + Q)^{-1} Y^T P \quad (3)$$

where G is the gain, Y is the sensitivity matrix, $Y^T$ is the transpose matrix of Y, P and Q are weight matrices, and $-1$ indicates the inverse matrix. Then, a step 125 computes a correction $\Delta v$ of each control amount from the following relationship:

$$\Delta v = -G \Delta Z \quad (4)$$

where, $\Delta Z$ is the differences in vector expression between the measured and estimated values of the reservoir outlet flow rate and monitoring point pressure. Lastly, a step 126 writes the newly obtained control amounts in the memory unit 15. By virtue of the above-described simple linear computation (in less than one second by the HIDIC-80E), the control amounts can be corrected satisfactorily for the practical use.

From the foregoing description it will be seen that the present invention makes possible an on-line control of a water distribution network, particularly an on-line water distribution control which has heretofore been impossible due to the large scale and non-linearity of the network. For instance, the computation of optimum control amounts which has heretofore required a computing time of over one hour with the conventional Newton's method is now performed in about five minutes. Further, the addition of a correction computing unit having the function of absorbing model errors and estimation errors makes it possible to perform a control closely related to reality.

Further, while it is said that the amount of leakage amounts to 20% of the total amount of water distribution under the present conditions where no water distribution control is accomplished, the result of the computation of water leakage based on the pressure distributation obtained by performing the water distribution control according to the method of this invention and the pressure distribution obtained without the water distribution control showed a reduction of little over 20% in the amount of leakage. Thus, the invention has many advantages.

We claim:

1. In a water distribution network including a plurality of reservoirs, a plurality of flow meters for respectively measuring outlet flow rates of said reservoirs, a plurality of distributing pipes for interconnecting said reservoirs to demand nodes from which water is supplied to respective consumers, a plurality of pressure gauges for measuring respective pressures at selected points on said distributing pipes, and actuating means for varying said flow rates and pressures, a method for controlling the pressures at said selected points and the outlet flow rates of said reservoir comprising the steps of:

preparing a network model of said water distribution network;

estimating demands at said demand nodes from the outlet flow rates measured by said flow meters;

computing control amounts of said actuating means based on the estimated demands at said demand nodes so as to obtain optimum values of said flow rates and said pressures according to said network model;

computing estimated flow rate and pressure values corresponding to said control amounts;

determining a sensitive matrix indicative of affects of small variation of said control amounts on said flow rates and said pressures according to said network model;

obtaining differences between said estimated flow rate and pressure values, the actual flow rate and pressure values measured by said flow meters and said pressure gauges wherein said computed control amounts are applied to said actuating means;

correcting said control amounts by multiplying gains determined on said sensitive matrix; and performing an operation by said actuating means in accordance with said corrected control amounts.

2. A method according to claim 1, wherein said step of computing estimated flow rate and pressure values corresponding to said control amounts is performed by applying to said network model a predetermined calculating method prepared so as to minimize the loss of energy therein.

3. In a water distribution network including a plurality of reservoirs, a plurality of flow meters for respectively measuring outlet flow rates of said reservoirs, a plurality of distributing pipes for interconnecting said reservoirs to demand nodes from which water is supplied to respective consumers, a plurality of pressure gauges for measuring respective pressures at selected points on said distributing pipes, and actuating means for varying said flow rates and pressures, an apparatus for controlling the pressures and flow rates in said water distribution network comprising:

means for estimating demands at said demand nodes from the outlet flow rates measured by said flow meters;

means for computing control amounts of said actuating means based on the estimated demands of said demand nodes so as to obtain optimum values of said flow rates and said pressures in accordance with a network model of said water distribution network;

means for computing estimated flow rate and pressure values corresponding to said control amounts;

means for determining a sensitive matrix indicative of affects of small variations of said control amounts on said flow rates and said pressures according to the network model;

means for obtaining differences between said estimated flow rate and pressure values and the actual flow rate and pressure values measured by said flow meter and said pressure gauges wherein said computed control amounts are applied to said actuating means;

means for correcting said control amounts by multiplying gains determined on said sensitive matrix in accordance with said differences; and means for performing an operation by said actuating means in accordance with said corrected control amounts.

* * * * *